US008560573B2

(12) United States Patent
Watanabe et al.

(10) Patent No.: US 8,560,573 B2
(45) Date of Patent: Oct. 15, 2013

(54) MAP DIFFERENCE DATA GENERATION APPARATUS AND MAP DIFFERENCE DATA GENERATION METHOD

(75) Inventors: Takayuki Watanabe, Kariya (JP);
Hidetoshi Fujimoto, Makinohara (JP);
Takamitsu Suzuki, Okazaki (JP);
Takayuki Suzuki, Narashino (JP);
Kaoru Shibata, Kawasaki (JP); Akio Samizu, Yokohama (JP)

(73) Assignees: Denso Corporation, Kariya (JP);
Kousokuya, Inc., Kawasaki (JP)

( * ) Notice: Subject to any disclaimer, the term of this patent is extended or adjusted under 35 U.S.C. 154(b) by 0 days.

(21) Appl. No.: 13/557,567

(22) Filed: Jul. 25, 2012

(65) Prior Publication Data
US 2013/0031049 A1 Jan. 31, 2013

(30) Foreign Application Priority Data

Jul. 27, 2011 (JP) ................. 2011-164367

(51) Int. Cl.
*G06F 17/30* (2006.01)
(52) U.S. Cl.
USPC ........... 707/791; 707/610; 707/640; 707/661; 707/688; 707/802
(58) Field of Classification Search
USPC ................................. 707/600–899
See application file for complete search history.

(56) References Cited

U.S. PATENT DOCUMENTS

| 2003/0182052 A1* | 9/2003 | DeLorme et al. ............. 701/201 |
| 2010/0030460 A1 | 2/2010 | Sawai et al. |
| 2010/0204917 A1 | 8/2010 | Tanabe |
| 2011/0191285 A1 | 8/2011 | Sawai |

FOREIGN PATENT DOCUMENTS

| JP | 2006-201125 | 8/2006 |
| JP | 2009-025204 | 2/2009 |

* cited by examiner

*Primary Examiner* — Isaac M Woo
(74) *Attorney, Agent, or Firm* — Harness, Dickey & Pierce, PLC

(57) ABSTRACT

A map difference data generation apparatus includes: most recent and supplementary map data storage devices storing primary most recent and supplementary map data, respectively; a map update reflection device generating secondly most recent and supplementary map data according to an update of a first link, and generating tertiary most recent and supplementary map data according to an update of a second link; a determination device determining a dependency relationship between the update of the first and second links, in accordance with results of searching a route in the tertiary most recent and supplementary map data between first and second nodes, which are both ends of the second link; and a map difference data generation device generating map difference data, which defines a combination of the update of the first and second links, when the update of the first and second links have the dependency relationship.

11 Claims, 6 Drawing Sheets

ROUTE SEARCH FAILED

ROUTE SEARCH SUCCEEDED

GROUP ADD OF LINKS h1, h2 AND
DEL OF LINK e1 AS MAP DIF D

DELETE LINKS n1, n2 FROM TEMP 2ND SUPPLE MAP D

ROUTE SEARCH SUCCEEDED

GROUP DEL OF LINKS l1, l2 AND
DEL OF LINKS n1, n2 AS MAP DIF D

MAP DIFFERENCE DATA GENERATION APPARATUS AND MAP DIFFERENCE DATA GENERATION METHOD

CROSS REFERENCE TO RELATED APPLICATION

This application is based on Japanese Patent Application No. 2011-164367 filed on Jul. 27, 2011, the disclosure of which is incorporated herein by reference.

TECHNICAL FIELD

The present disclosure relates to a map difference data generation apparatus and a map difference data generation method for generating map difference data in response to map update to add or delete a link from map data indicating a connection mode between nodes and links.

BACKGROUND

A map may be updated to require link addition or deletion and cause a difference in map data before and after a link is added or deleted. In such a case, a map difference data distribution apparatus conventionally generates the difference as map difference data and distributes the map difference data to a vehicle navigation system. For example, patent document 1 discloses the technology that generates map difference data on an area basis and distributes the map difference data to a vehicle navigation system.

Patent Document 1: JP-A-2008-249798 (corresponding to US 2010/0030460)

However, the method disclosed in patent document 1 generates map difference data on an area basis and is likely to update information unneeded for a user. There is a possible problem to increase the traffic (communication time) for map difference data distributed to the vehicle navigation system from the map difference data distribution apparatus. There is another possible problem to unsuccessfully ensure a road network. For example, there may be a road across two areas. The road may be displayed discontinuously if one of the areas is updated and the other is not updated.

SUMMARY

It is an object of the present disclosure to provide a map difference data generation apparatus and a map difference data generation method capable of generating map difference data that can suppress the traffic for distribution to a vehicle and ensure a road network.

According to a first aspect of the present disclosure, a map difference data generation apparatus includes: a most recent map data storage device that stores primary most recent map data indicating a connection status of a node and a link of a map; a supplementary map data storage device that stores primary supplementary map data indicating a connection status of the node and the link, which is initially equal to the primary most recent map data; a map update reflection device that generates secondly most recent map data and secondly supplementary map data according to an update of a first link in the primary recent map data when map update for updating the first link is established, and generates tertiary most recent map data and tertiary supplementary map data according to an update of a second link in the secondly most recent map data when map update for updating the second link is established after the update of the first link; a determination device that determines whether the update of the first link and the update of the second link have a dependency relationship, in accordance with a result of searching a route in the tertiary supplementary map data between a first node and a second node, which are both ends of the second link, respectively, and a result of searching the route between the first node and the second node in the tertiary most recent map data; and a map difference data generation device that generates map difference data, which defines a combination of the update of the first link and the update of the second link, when the determination device determines that the update of the first link and the update of the second link have the dependency relationship.

In the above apparatus, unlike a related art that generates map difference data on an area basis, generating map difference data on a link basis can suppress the traffic of map difference data distributed to a vehicle. Update of the first link and update of the second link are assumed to maintain dependency and are grouped to generate map difference data. The road network can thereby be secured.

According to a second aspect of the present disclosure, a map difference data generation method includes: preparing primary most recent map data indicating a connection status of a node and a link of a map; preparing primary supplementary map data indicating a connection status of the node and the link, which is initially equal to the primary most recent map data; generating secondary most recent map data and secondary supplementary map data in accordance with an update of a first link in the primary most recent map data when map update for updating the first link is established; generating tertiary most recent map data and tertiary supplementary map data in accordance with an update of a second link in the secondly most recent map data when map update for updating the second link is established after the update of the first link; determining whether the update of the first link and the update of the second link have a dependency relationship, in accordance with a result of searching a route in the tertiary supplementary map data between a first node and a second node, which are both ends of the second link, respectively, and a result of searching the route between the first node and the second node in the tertiary most recent map data; and generating map difference data, which defines a combination of the update of the first link and the update of the second link, when the determination device determines that the update of the first link and the update of the second link have the dependency relationship.

In the above method, unlike a related art that generates map difference data on an area basis, generating map difference data on a link basis can suppress the traffic of map difference data distributed to a vehicle. Update of the first link and update of the second link are assumed to maintain dependency and are grouped to generate map difference data. The road network can thereby be secured.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
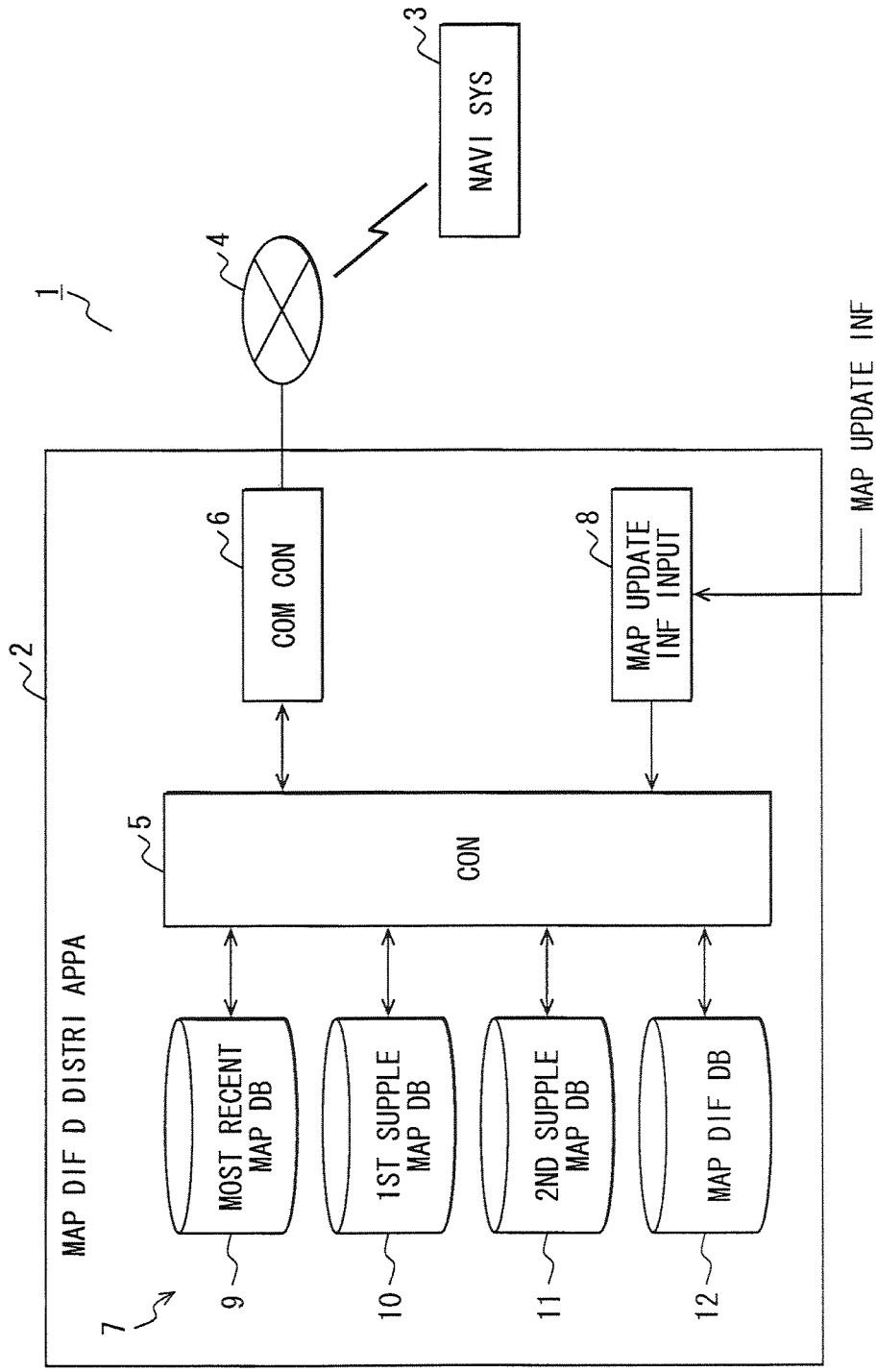
FIG. 1 is a block diagram showing a map difference data distribution system according to an embodiment of the present disclosure.

An embodiment of the present disclosure will be described in further detail with reference to the accompanying drawings. FIG. 1 schematically shows a map difference data distribution system that distributes map data to a vehicle navigation system from a map difference data distribution apparatus. A map difference data distribution system 1 includes a map difference data distribution apparatus 2, a vehicle navigation system 3, and a communication network 4. The map difference data distribution apparatus 2 distributes map data and is equivalent to a map difference data generation apparatus according to the disclosure. The vehicle navigation system 3 receives map data distributed from the map difference data distribution apparatus 2 and is equivalent to an onboard apparatus according to the disclosure. In the map difference data distribution system 1, the map difference data distribution apparatus 2 communicates with the vehicle navigation system 3 through the communication network 4. The communication network 4 includes a fixed communication network and a mobile communication network.

The map difference data distribution apparatus 2 includes a controller 5 (equivalent to a map update reflection means, i.e., a map update reflection device, a determination means, i.e., a determination device, and a map difference data generation means, i.e., a map difference data generation device according to the disclosure), a communication controller 6 (equivalent to a map difference data distribution means, i.e., a map difference data distribution device according to the disclosure), a map database group 7, and a map update information input portion 8.

The controller 5 is provided as a known microcomputer including a CPU, RAM, ROM, and an I/O bus. The controller 5 controls overall operations such as data management operation and communication operation for the map difference data distribution apparatus 2. The communication controller 6 controls wide area communication with the communication network 4. The map database group 7 includes a most recent map database 9 (equivalent to a most recent map data storage means, i.e., a most recent map data storage device according to the disclosure), a first supplementary map database 10 (equivalent to a supplementary map data storage means, i.e., a supplementary map data storage device and a first supplementary map data storage means, i.e., a supplementary map data storage device according to the disclosure), a second supplementary map database 11 (equivalent to a supplementary map data storage means, i.e., a supplementary map data storage device and a second supplementary map data storage means, i.e., a second supplementary map data storage device according to the disclosure), and a map difference database 12.

The map update information input portion 8 supplies map update information from the outside so as to require adding or deleting a link from map data. If a road is opened or closed, for example, an operator (worker) accordingly operates an input device (not shown) such as a keyboard and a mouse. In this case, the map update information is supplied to the map update information input portion 8.

The most recent map database 9 stores most recent map data indicating connection mode between nodes and links. A node represents an intersection (branch point) on a road. A link represents a road between nodes including a direction that permits a vehicle to travel. If a road is opened, the map update information requiring link addition is supplied to the map update information input portion 8. The controller reflects the link addition on most recent map data stored in the most recent map database 9. If a road is closed, the map update information requiring link deletion is supplied to the map update information input portion 8. The controller reflects the link deletion on most recent map data stored in the most recent map database 9. The most recent map data stored in most recent map database 9 is updated regardless of whether the map update occurs to require adding or deleting a link.

Initially, map data is registered to the first supplementary map database 10. In this state, the first supplementary map database 10 stores first supplementary map data, that is, the map data equal to most recent map data stored in the most recent map database 9. Suppose that the map update information requiring link deletion is supplied to the map update information input portion 8. In this case, the controller 5 reflects the link deletion on the first supplementary map data stored in the first supplementary map database 10. Suppose that the map update information requiring link addition is supplied to the map update information input portion 8. In this case, the controller 5 does not reflect the link addition on the first supplementary map data stored in the first supplementary map database 10. That is, the first supplementary map data stored in the first supplementary map database 10 is updated only if the map update requires link deletion. The first supplementary map data is not updated if the map update requires link addition.

Initially, map data is registered to the second supplementary map database 11. In this state, the second supplementary map database 11 stores second supplementary map data, that is, the map data equal to most recent map data stored in the most recent map database 9. Suppose that the map update information requiring link addition is supplied to the map update information input portion 8. In this case, the controller 5 reflects the link addition on the second supplementary map data stored in the second supplementary map database 11. Suppose that the map update information requiring link deletion is supplied to the map update information input portion 8. In this case, the controller 5 does not reflect the link deletion on the second supplementary map data stored in the second supplementary map database 11. That is, the second supplementary map data stored in the second supplementary map database 11 is updated only if the map update requires link addition. The second supplementary map data is not updated if the map update requires link deletion.

The first supplementary map data stored in the first supplementary map database 10 is precisely opposite to the second supplementary map data stored in the second supplementary map database 11. The first supplementary map data is updated only if the map update requires link deletion or decreases available routes for a vehicle to travel. The first supplementary map data reflects the map update that is disadvantageous to users. On the other hand, the second supplementary map data is updated only if the map update requires link addition or increases available routes for a vehicle to travel. The second supplementary map data reflects the map update that is advantageous to users.

The vehicle navigation system 3 includes various functions to perform known navigation processes. The functions included are: specifying a current vehicle position; reading map data stored in a storage medium; drawing a map in accordance with the read map data; specifying a destination; searching for a route from the current position to the destination; drawing a searched route on the map; guiding a vehicle in accordance with the searched route; and performing wide area communication with the communication network 4. The vehicle navigation system 3 receives map difference data distributed from the map difference data distribution apparatus 2. The vehicle navigation system 3 then updates map data stored in the recording medium based on the map difference data. After that, the vehicle navigation system 3 draws a map or provides route guidance in accordance with the most recent map data updated based on the map difference data.

Figure 2:
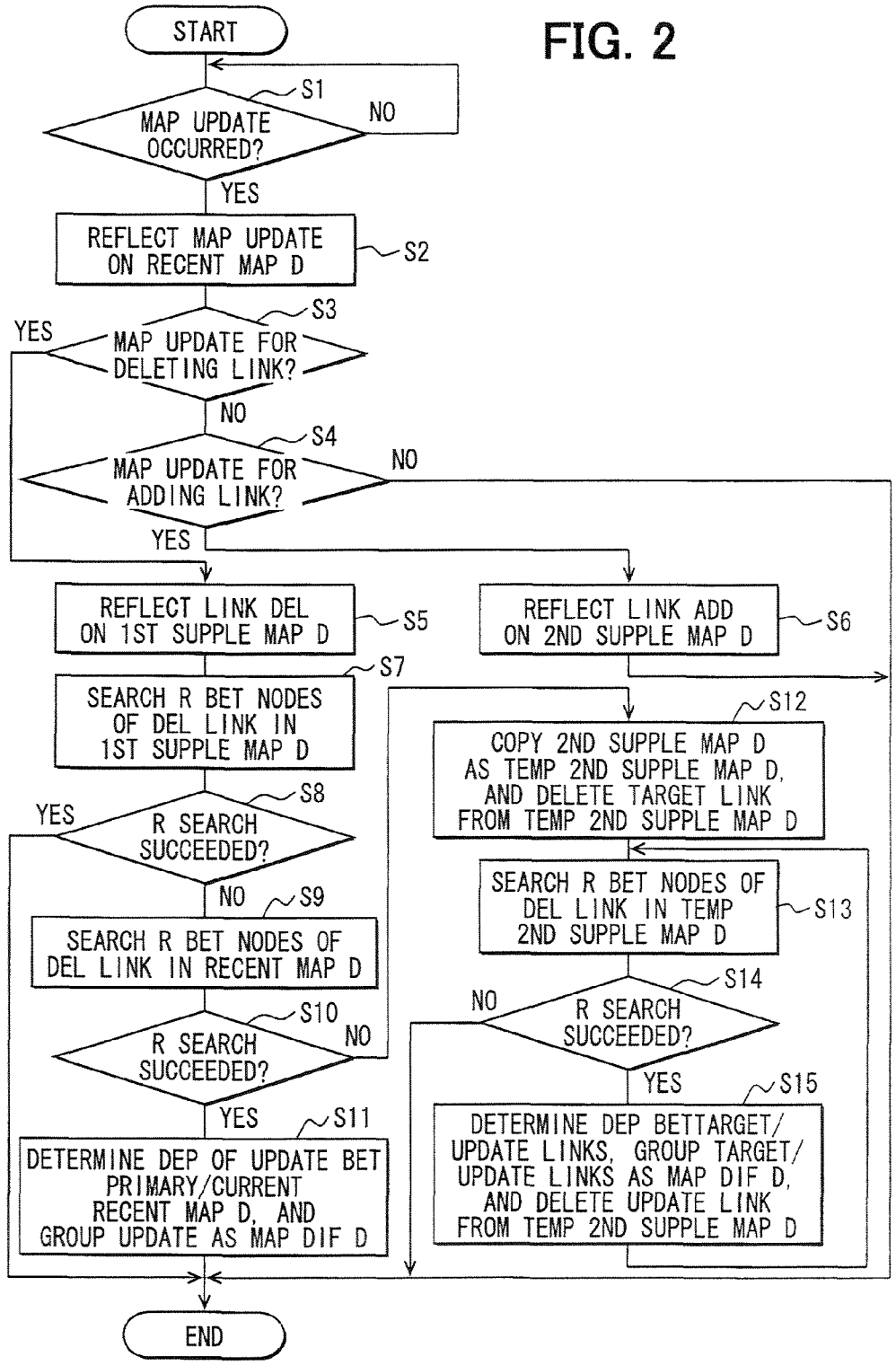
FIG. 2 is a flowchart showing a process performed by a map difference data distribution apparatus.

With reference to FIGS. 2 through 6, the following describes effects of the above-mentioned configurations. FIG. 2 is a flowchart showing a process performed by the controller 5 of the map difference data distribution apparatus 2. In the map difference data distribution apparatus 2, the controller 5 determines whether a map update occurs (step S1). To do this, the controller 5 determines whether map update information is supplied to the map update information input portion 8. The controller 5 may determine that a map update occurs (YES at step S1) if the map update information is determined to be supplied to the map update information input portion 8 in accordance with an operator's operation on an input device, for example. In this case, the controller 5 reflects the map update content on the most recent map data stored in the most recent map database 9 (step S2). If a map update occurs to require link addition, the controller 5 reflects the link addition on the most recent map data. If a map update occurs to require link deletion, the controller 5 reflects the link deletion on the most recent map data.

The controller 5 determines whether the map update requires link addition or link deletion (steps S3 and S4). If the map update is determined to require link deletion (YES at step S3), the controller 5 reflects the link deletion on the first supplementary map data stored in the first supplementary map database 10 (step S5). In this case, the controller 5 does not reflect the link deletion on the second supplementary map data stored in the second supplementary map database 11.

If the map update is determined to require link addition (YES at step S4), the controller 5 reflects the link addition on the second supplementary map data stored in the second supplementary map database 11 (step S6). In this case, the controller 5 does not reflect the link addition on the first supplementary map data stored in the first supplementary map database 10.

After the first supplementary map data reflects the link deletion, the controller 5 searches for a route between nodes corresponding to both ends of the deleted link using the first supplementary map data stored in the first supplementary map database 10 at the time point, that is, the first supplementary map data reflecting the link deletion (step S7). The controller 5 determines whether searching the first supplementary map data for the route succeeds to enable traffic between nodes (step S8).

The controller 5 terminates the process if searching the first supplementary map data for the route is determined to succeed (YES at step S8). If searching the first supplementary map data for the route is determined to fail (NO at step S8), the controller 5 searches for the route between nodes corresponding to both ends of the deleted link using the most recent map data stored in the most recent map database 9 at the time (step S9). The controller 5 determines whether searching the most recent map data for the route succeeds (step S10).

If the controller 5 determines that searching the most recent map data for the route succeeds (YES at step S10), the controller 5 determines dependency in the contents of the map update occurred from the primary most recent map data to the current most recent map data. The controller 5 groups the contents of the map update determined to have the dependency as map difference data (step S11) and terminates the process.

If searching the most recent map data for the route is determined to fail (NO at step S10), the controller 5 copies the second supplementary map data to create temporary second supplementary map data and deletes the link from the temporary second supplementary map data (step S12). The controller 5 searches the temporary second supplementary map data for the route between nodes corresponding to both ends of the link (step S13). The controller 5 determines whether searching the temporary second supplementary map data for the route succeeds (step S14).

If searching the temporary second supplementary map data for the route is determined to succeed (YES at step S14), the controller 5 determines dependency between the link and an updated link contained in the route corresponding to the successful route search. The controller 5 groups the contents of the map update determined to have the dependency as map difference data and deletes the updated link contained in the route corresponding to the successful route search from the temporary second supplementary map data (step S15). The controller 5 repeats steps S13 and S14. The controller 5 terminates the process if searching the temporary second supplementary map data for the route is determined to fail (NO at step S14).

The following describes examples of the above-mentioned processes with reference to FIGS. 3 through 6.

Case (1): A map update occurs to require addition of a first link and then another map update occurs to require deletion of a second link.

Case (2): A map update occurs to require deletion of a first link and then another map update occurs to require deletion of a second link.

Case (1): A map update occurs to require addition of a first link and then another map update occurs to require deletion of a second link.

Figure 3:
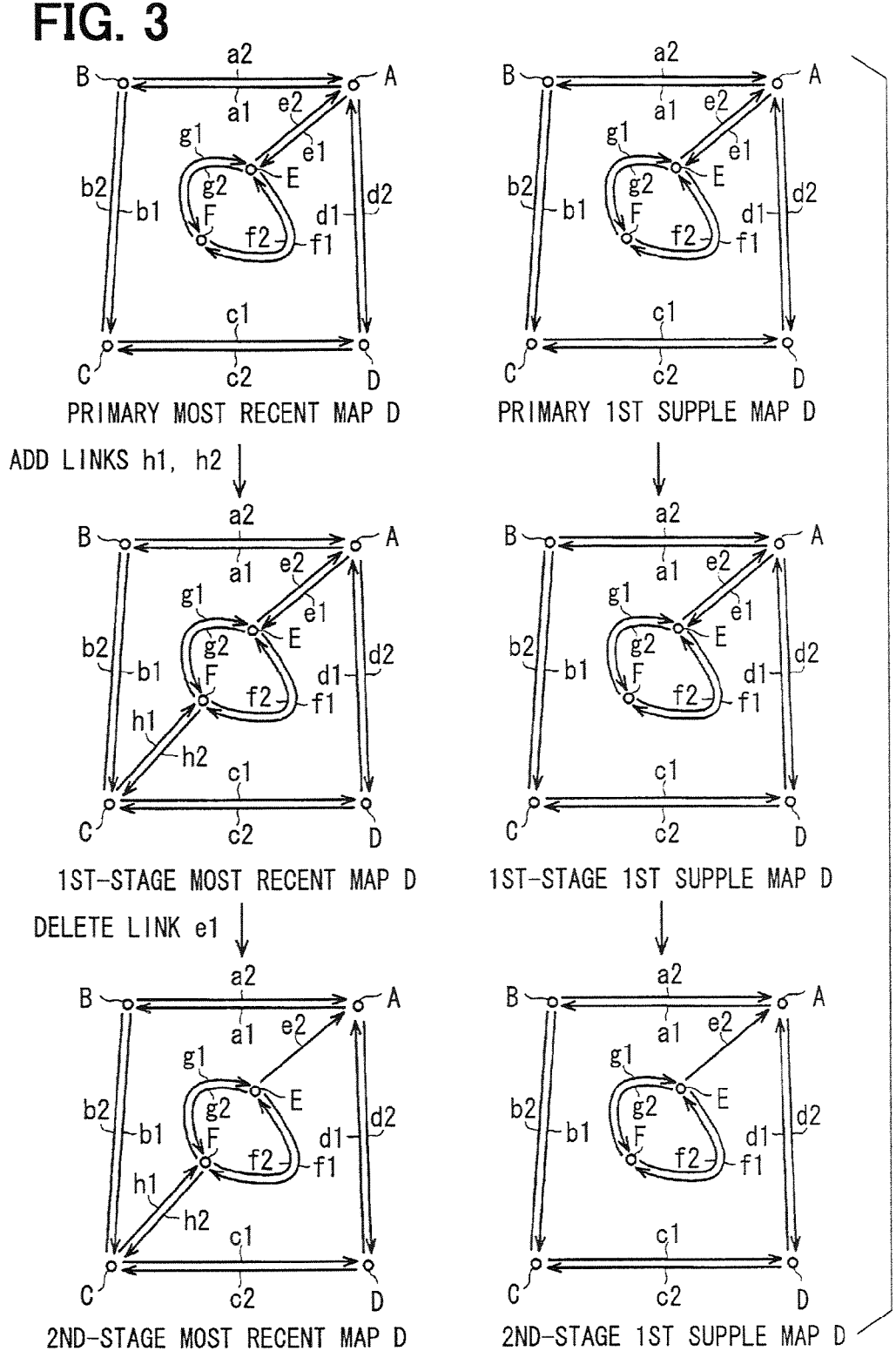
FIG. 3 is a diagram showing transition of most recent map data and first supplementary map data.

In this case, the primary most recent map data stored in the most recent map database 9 maintains the connection mode for nodes A through F and links a1 and a2 through g1 and g2 as shown in FIG. 3. Primary first supplementary map data stored in the first supplementary map database 10 equals the primary most recent map data. In this state, a map update occurs to require adding links h1 and h2 (equivalent to first link) that connect nodes C and F. The controller 5 reflects the addition of links h1 and h2 on the primary most recent map data to generate first-stage most recent map data (equivalent to secondary most recent map data). The controller 5 keeps the primary first supplementary map data unchanged without reflecting the addition of links h1 and h2 on the primary first supplementary map data. The controller 5 assumes the primary first supplementary map data to be first-stage first supplementary map data (equivalent to secondary first supplementary map data).

In this state, a map update occurs to require deleting link e1 (equivalent to second link) that connects nodes A and E. The controller 5 reflects the deletion of line e1 on the first-stage most recent map data to generate second-stage most recent map data (equivalent to tertiary most recent map data). The controller 5 reflects the deletion of link e1 on the first-stage first supplementary map data to generate second-stage first supplementary map data (equivalent to tertiary first supplementary map data).

Figure 4:
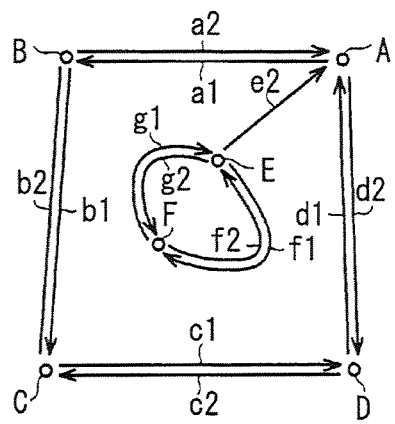
FIG. 4 is a diagram showing how to determine dependency.
Figure 4:
Figure 4:
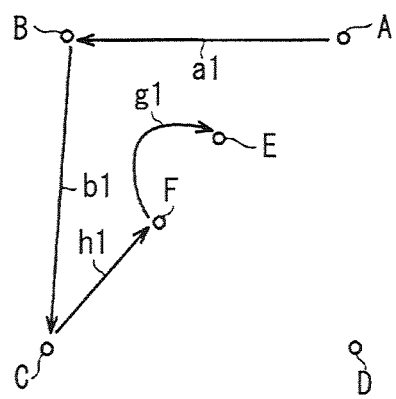
Figure 4:

As shown in FIG. 4, the controller 5 searches the second-stage first supplementary map data for a route from node A (equivalent to first node) to node E (equivalent to second node). Nodes A and E correspond to both ends of the deleted link e1. The controller 5 fails in searching for a route from node A to node E because the second-stage first supplementary map data does not reflect addition of links h1 and h2 as described above. The controller 5 fails in searching the second-stage first supplementary map data for a route. The controller 5 then searches the second-stage most recent map data for a route from node A to node E. Nodes A and E correspond to both ends of the deleted link e1. The controller 5 succeeds in searching for a route from A to node E including link h1 or h2 because the second-stage most recent map data reflects addition of links h1 and h2. Specifically, the controller 5 succeeds in searching for the route passing through links a1, b1, h1, and g1 (or f2).

If searching the second-stage most recent map data for a route succeeds, the controller 5 assumes dependency between the addition of links h1 and h2 and the deletion of link e1, that is, the contents of the map update occurred from the primary most recent map data to the current most recent map data. The controller 5 groups the addition of links h1 and h2 and the deletion of link e1 as map difference data and stores it in the map difference database 12. The controller 5 then allows the vehicle navigation system 3 to perform user operation so that the user can use the vehicle navigation system 3 to request for the map difference data, for example. The communication controller 6 receives a map difference data request signal transmitted from the vehicle navigation system 3. The controller 5 reads the map difference data that is stored in the map difference database 12 and indicates the addition of links h1 and h2 and the deletion of link e1. The controller 5 allows the communication controller 6 to transmit the map difference data to the vehicle navigation system 3.

Notifying only the deletion of link e1 is equivalent to notifying the absence of a route from node A to node E. However, the addition of links h1 and h2 as well as the deletion of link e1 is notified as a group having the dependency. This can notify the presence of a route from node A to node E and accurately notify the actual road situation. This can prevent an available route based on the actual road situation from being inadvertently notified as an unavailable route.

Case (2): A map update occurs to require deletion of a first link and then another map update occurs to require deletion of a second link.

Figure 5:
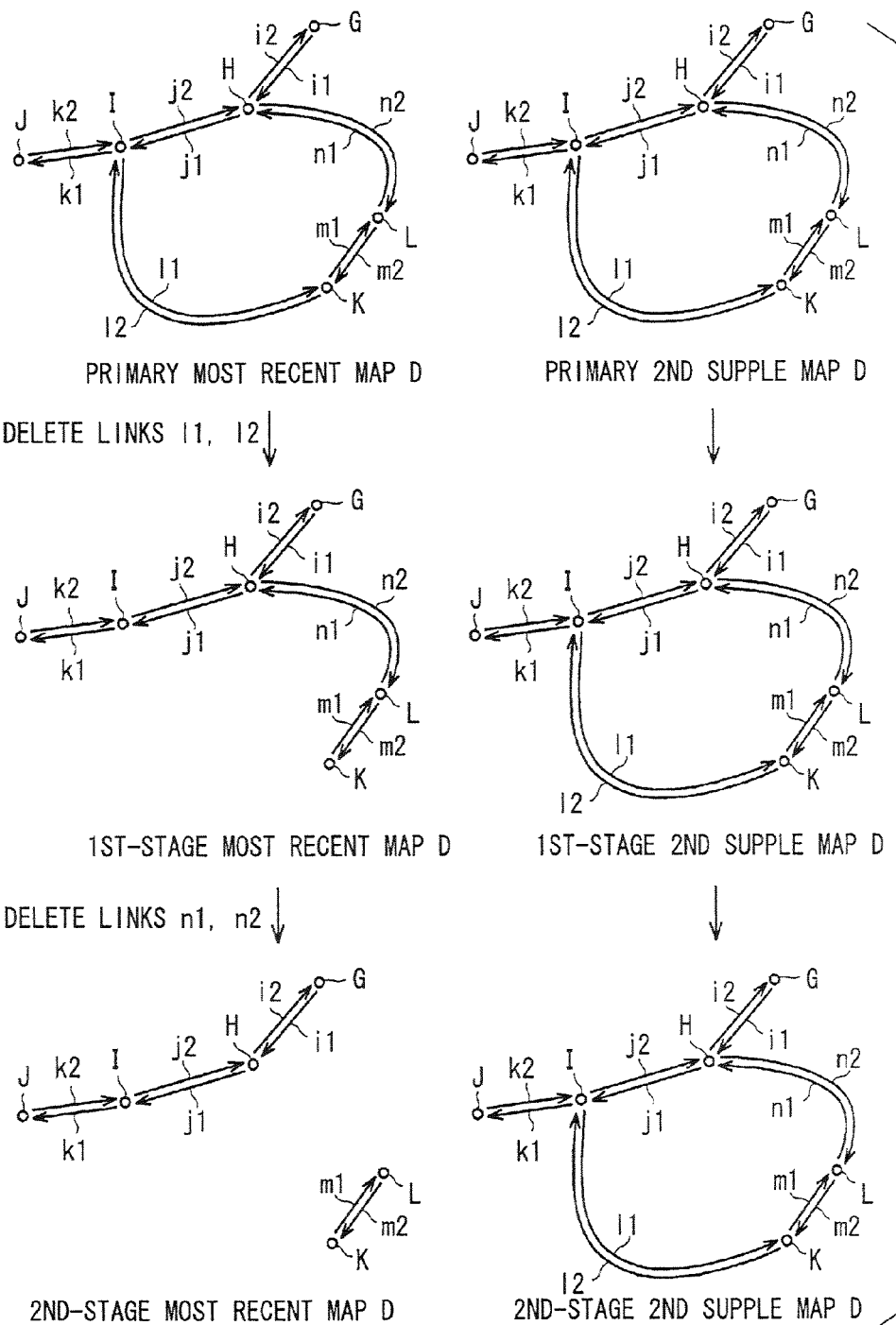
FIG. 5 is a diagram showing transition of most recent map data and second supplementary map data.

In this case, the primary most recent map data stored in the most recent map database 9 maintains the connection mode for nodes G through L and links i1 and i2 through n1 and n2 as shown in FIG. 5. The primary first supplementary map data stored in the second supplementary map database 11 equals the primary most recent map data. In this state, a map update occurs to require deleting links l1 and l2 (equivalent to first link) that connect nodes I and K. The controller 5 reflects the deletion of links l1 and l2 on the primary most recent map data to generate first-stage most recent map data (equivalent to secondary most recent map data). The controller 5 keeps the primary second supplementary map data unchanged without reflecting the deletion of links l1 and l2 on the primary second supplementary map data. The controller 5 assumes the primary second supplementary map data to be first-stage second supplementary map data (equivalent to secondary second supplementary map data).

In this state, a map update occurs to require deleting links n1 and n2 (equivalent to second link) that connect nodes H and L. The controller 5 reflects the deletion of links n1 and n2 on the first-stage most recent map data to generate second-stage most recent map data (equivalent to tertiary most recent map data). The controller 5 assumes the first-stage second supplementary map data to be second-stage second supplementary map data (equivalent to tertiary second supplementary map data) without reflecting the deletion of links n1 and n2 on the first-stage second supplementary map data.

Figure 6:
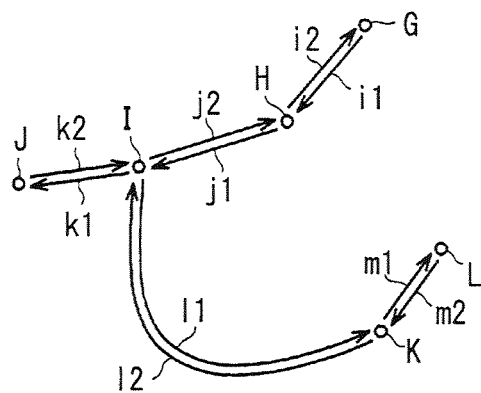
FIG. 6 is a diagram showing how to determine dependency.
Figure 6:
Figure 6:
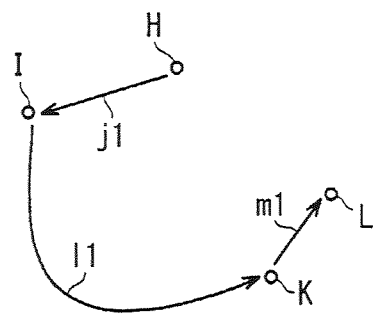
Figure 6:

As shown in FIG. 6, the controller 5 copies the second-stage second supplementary map data to generate the temporary second supplementary map data. The controller 5 deletes links n1 and n2 from the temporary second supplementary map data. Both ends of the deleted links n1 and n2 correspond to node H (equivalent to first node) and node L (equivalent to second node). The controller 5 searches the temporary second supplementary map data for a route from node H to node L (or from node L to node H). The temporary second supplementary map data reflects the deletion of links n1 and n2 but not the deletion of links l1 and l2. Therefore, the controller 5 succeeds in searching for a route from node H to node L succeeds. Specifically, the controller 5 succeeds in searching for the route passing through links j1, l1, and m1.

The controller 5 assumes dependency between the deletion of links l1 and l2 and the deletion of links n1 and n2 while these links are contained in the successfully searched route. The controller 5 groups the deletion of links l1 and l2 and the deletion of links n1 and n2 as map difference data and stores it in the map difference database 12. The controller 5 then allows the vehicle navigation system 3 to perform user operation so that the user can use the vehicle navigation system 3 to request for the map difference data, for example. The communication controller 6 receives a map difference data request signal transmitted from the vehicle navigation system 3. The controller 5 reads the map difference data that is stored in the map difference database 12 and indicates the deletion of links l1 and l2 and the deletion of links n1 and n2. The controller 5 allows the communication controller 6 to transmit the map difference data to the vehicle navigation system 3.

Notifying only the deletion of links n1 and n2 is equivalent to notifying the presence of a route from node H to node L. However, the deletion of links l1 and l2 as well as the deletion of links n1 and n2 is notified as a group having the dependency. This can notify the absence of a route from node H to node L and accurately notify the actual road situation. This can prevent an unavailable route based on the actual road situation from being inadvertently notified as an available route.

There has been described the map difference data distribution apparatus 2 according to the embodiment. A map update occurs to require addition of the first link to the primary most recent map data. A map update then occurs to require deletion of the second link. The map difference data distribution apparatus 2 fails in a route search using the second-stage first supplementary map data between the nodes as both ends of the second link. The map difference data distribution apparatus 2 succeeds in a route search using the second-stage most recent map data between the nodes as both ends of the second link. The map difference data distribution apparatus 2 assumes dependency between the addition of the first link and the deletion of the second link and generates map difference data.

According to the map difference data distribution apparatus 2, a map update occurs to require deleting the first link from the primary most recent map data. Another map update occurs to require deleting the second link. Then, the map difference data distribution apparatus 2 succeeds in searching for a route using the temporary second supplementary map data between nodes corresponding to both ends of the second link. The map difference data distribution apparatus 2 assumes dependency between the deletion of the first link and the deletion of the second link and generates map difference data.

Generating the map difference data on a link basis can suppress the traffic of map difference data distributed to the vehicle navigation system 3. Addition of the first link and deletion of the second link are assumed to maintain dependency and are grouped to generate map difference data. Deletion of the first link and deletion of the second link are assumed to maintain dependency and are grouped to generate map difference data. The road network can thereby be secured.

The disclosure is not limited to the above-mentioned embodiment but can be modified or enhanced as follows.

According to the embodiment, a map update occurs to require adding a link once. A map update occurs to require deleting a link once. Dependency is then assumed between adding the link once and deleting the link once to generate map difference data. In addition, a map update may occur to require adding a link twice or more. A map update may occur to require deleting a link twice or more. Dependency may be then assumed between adding the link twice or more and deleting the link twice or more to generate map difference data.

According to the embodiment, a map update occurs to require deleting a link twice. Then, the dependency is assumed between two link deletions to generate map difference data. In addition, a map update may occur to require deleting a link three times or more. Then, the dependency may be assumed among three link deletions or more to generate map difference data.

The map difference data distribution apparatus 2 may distribute map difference data to the vehicle navigation system 3 at any timing. According to the embodiment, map difference data is distributed when a user of the vehicle navigation system 3 performs operation to request map difference data on the vehicle navigation system 3. The disclosure is not limited thereto. Map difference data may be periodically distributed each time a predetermined period (e.g., 30 days) elapses. Alternatively, map difference data may be distributed each time the managed travel distance for a vehicle reaches a predetermined value.

The above disclosure has the following aspects.

According to a first aspect of the present disclosure, a map difference data generation apparatus includes: a most recent map data storage device that stores primary most recent map data indicating a connection status of a node and a link of a map; a supplementary map data storage device that stores primary supplementary map data indicating a connection status of the node and the link, which is initially equal to the primary most recent map data; a map update reflection device that generates secondly most recent map data and secondly supplementary map data according to an update of a first link in the primary recent map data when map update for updating the first link is established, and generates tertiary most recent map data and tertiary supplementary map data according to an update of a second link in the secondly most recent map data when map update for updating the second link is established after the update of the first link; a determination device that determines whether the update of the first link and the update of the second link have a dependency relationship, in accordance with a result of searching a route in the tertiary supplementary map data between a first node and a second node, which are both ends of the second link, respectively, and a result of searching the route between the first node and the second node in the tertiary most recent map data; and a map difference data generation device that generates map difference data, which defines a combination of the update of the first link and the update of the second link, when the determination device determines that the update of the first link and the update of the second link have the dependency relationship.

In the above apparatus, unlike a related art that generates map difference data on an area basis, generating map difference data on a link basis can suppress the traffic of map difference data distributed to a vehicle. Update of the first link and update of the second link are assumed to maintain dependency and are grouped to generate map difference data. The road network can thereby be secured.

Alternatively, the supplementary map data storage device may include a first supplementary map data storage device that stores primary first supplementary map data indicating a connection status of the node and the link, which is initially equal to the primary most recent map data. The map update reflection device generates the secondly most recent map data by adding the first link on the primary most recent map data, and generates secondly first supplementary map data by maintaining the primary first supplementary map data without any change, when the update of the first link requires adding the first link to the primary most recent map data. The map update reflection device generates the tertiary most recent map data by deleting the second link from the secondly most recent map data, and generates tertiary first supplementary map data by deleting the second link from the secondly first supplementary map data, when the update of the second link requires deleting the second link from the secondly most recent map data. When the determination device searches the route in the tertiary first supplementary map data, and fails to search the route between the first node and the second node, the determination device searches the route in the tertiary most recent map data. When the determination device searches the route in the tertiary first supplementary map data, and succeeds to search the route, the determination device determines that addition of the first link and deletion of the second link have the dependency relationship. The map difference data generation device generates the map difference data, which defines a combination of the addition of the first link and the deletion of the second link, when the determination device determines that the addition of the first link and the deletion of the second link have the dependency relationship. In this case, the map difference data generation apparatus generates map difference data to group addition of the first link and deletion of the second link between which dependency is determined to exist. The road network can thereby be secured. Suppose that map difference data is generated so as to reflect only deletion of the second link without reflecting addition of the first link even though the first link is added in an actual road situation to provide an available route between the first and second nodes (route guidance enabled). The route is assumed to be unavailable (route guidance disabled) because addition of the first link is not reflected. The road network is not secured. The map difference data generation apparatus according to the disclosure generates map difference data reflecting addition of the first link and deletion of the second link between which dependency is determined to exist. This prevents generation of incorrect map difference data that represents an available route to be unavailable. The road network can be secured. The route guidance can be provided appropriately so as to reflect the actual road situation.

Further, the primary supplementary map data may include the primary first supplementary map data. The secondly supplementary map data may include the secondly first supplementary map data. The tertiary supplementary map data may include the tertiary first supplementary map data.

Alternatively, the supplementary map data storage device may include a second supplementary map data storage device that stores primary second supplementary map data indicating a connection status of the node and the link, which is initially equal to the primary most recent map data. The map update reflection device generates the secondly most recent map data by deleting the first link from the primary most recent map data, and generates secondly second supplementary map data by maintaining the primary second supplementary map data without any change, when the update of the first link requires deleting the first link from the primary most recent map data. The map update reflection device generates the tertiary most recent map data by deleting the second link from the secondly most recent map data, and generates tertiary second supplementary map data by maintaining the secondly second supplementary map data without any change, when the update of the second link requires deleting the second link from the secondly most recent map data. The determination device generates temporary second supplementary map data, which is a copy of the tertiary second supplementary map data, and deletes the second link from the temporary second supplementary map data. The determination device searches the route between the first node and the second node in the temporary second supplementary map data. When the determination device succeeds to search the route including the first link in the temporary second supplementary map data, the determination device determines that deletion of the first link and deletion of the second link have the dependency relationship. The map difference data generation device generates the map difference data, which defines a combination of the deletion of the first link and the deletion of the second link, when the determination device determines that the deletion of the first link and the deletion of the second link have the dependency relationship. In this case, the map difference data generation apparatus generates map difference data to group deletion of the first link and deletion of the second link between which dependency is determined to exist. The road network can thereby be secured. Suppose that map difference data is generated so as to reflect only deletion of the second link without reflecting deletion of the first link even though the first link is deleted in an actual road situation to provide an unavailable route between the first and second nodes (route guidance disabled). The route is assumed to be available (route guidance enabled) because deletion of the first link is not reflected. The road network is not secured. The map difference data generation apparatus according to the disclosure generates map difference data reflecting deletion of the first link and deletion of the second link between which dependency is determined to exist. This prevents generation of incorrect map difference data that represents an unavailable route to be available. The road network can be secured. The route guidance can be provided appropriately so as to reflect the actual road situation.

Alternatively, the map difference data generation apparatus may further include: a map difference data distribution device that distributes the map difference data generated by the map difference data generation device to an in-vehicle apparatus. In this case, the above feature can suppress the traffic of map difference data distributed to a vehicle. An onboard apparatus can be provided with map difference data that secures the road network.

According to a second aspect of the present disclosure, a map difference data generation method includes: preparing primary most recent map data indicating a connection status of a node and a link of a map; preparing primary supplementary map data indicating a connection status of the node and the link, which is initially equal to the primary most recent map data; generating secondary most recent map data and secondary supplementary map data in accordance with an update of a first link in the primary most recent map data when map update for updating the first link is established; generating tertiary most recent map data and tertiary supplementary map data in accordance with an update of a second link in the secondly most recent map data when map update for updating the second link is established after the update of the first link; determining whether the update of the first link and the update of the second link have a dependency relationship, in accordance with a result of searching a route in the tertiary supplementary map data between a first node and a second node, which are both ends of the second link, respectively, and a result of searching the route between the first node and the second node in the tertiary most recent map data; and generating map difference data, which defines a combination of the update of the first link and the update of the second link, when the determination device determines that the update of the first link and the update of the second link have the dependency relationship.

In the above method, unlike a related art that generates map difference data on an area basis, generating map difference data on a link basis can suppress the traffic of map difference data distributed to a vehicle. Update of the first link and update of the second link are assumed to maintain dependency and are grouped to generate map difference data. The road network can thereby be secured.

Alternatively, the map difference data generation method may further include: preparing primary first supplementary map data indicating a connection status of the node and the link, which is initially equal to the primary most recent map data; generating the secondly most recent map data by adding the first link on the primary most recent map data, and generating secondly first supplementary map data by maintaining the primary first supplementary map data without any change, when the update of the first link requires adding the first link to the primary most recent map data; generating the tertiary most recent map data by deleting the second link from the secondly most recent map data, and generating tertiary first supplementary map data by deleting the second link from the secondly first supplementary map data, when the update of the second link requires deleting the second link from the secondly most recent map data; searching the route in the tertiary first supplementary map data; searching the route in the tertiary most recent map data when the route between the first node and the second node is not searched in the tertiary first supplementary map data; determining that addition of the first link and deletion of the second link have the dependency relationship when the route between the first node and the second node is searched in the tertiary first supplementary map data; and generating the map difference data, which defines a combination of the addition of the first link and the deletion of the second link, when the addition of the first link and the deletion of the second link have the dependency relationship. In this case, the map difference data generation method generates map difference data to group addition of the first link and deletion of the second link between which dependency is determined to exist. This prevents generation of incorrect map difference data that represents an available route to be unavailable. The road network can be secured. The route guidance can be provided appropriately so as to reflect the actual road situation.

Alternatively, the map difference data generation method may further include: preparing primary second supplementary map data indicating a connection status of the node and the link, which is initially equal to the primary most recent map data; generating the secondly most recent map data by deleting the first link from the primary most recent map data, and generating secondly second supplementary map data by maintaining the primary second supplementary map data without any change, when the update of the first link requires deleting the first link from the primary most recent map data; generating the tertiary most recent map data by deleting the second link from the secondly most recent map data, and generating tertiary second supplementary map data by maintaining the secondly second supplementary map data without any change, when the update of the second link requires deleting the second link from the secondly most recent map data; generating temporary second supplementary map data, which is a copy of the tertiary second supplementary map data, and deleting the second link from the temporary second supplementary map data; searching the route between the first node and the second node in the temporary second supplementary map data; determining that deletion of the first link and deletion of the second link have the dependency relationship when the route including the first link is searched in the temporary second supplementary map data; and generating the map difference data, which defines a combination of the deletion of the first link and the deletion of the second link, when the deletion of the first link and the deletion of the second link have the dependency relationship. In this case, the map difference data generation method generates map difference data to group deletion of the first link and deletion of the second link between which dependency is determined to exist. This prevents generation of incorrect map difference data that represents an unavailable route to be available. The road network can be secured. The route guidance can be provided appropriately so as to reflect the actual road situation.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A map difference data generation apparatus comprising:
   a most recent map data storage device that stores primary most recent map data indicating a connection status of a node and a link of a map;
   a supplementary map data storage device that stores primary supplementary map data indicating a connection status of the node and the link, which is initially equal to the primary most recent map data;
   a map update reflection device that generates secondly most recent map data and secondly supplementary map data according to an update of a first link in the primary recent map data when map update for updating the first link is established, and generates tertiary most recent map data and tertiary supplementary map data according to an update of a second link in the secondly most recent map data when map update for updating the second link is established after the update of the first link;
   a determination device that determines whether the update of the first link and the update of the second link have a dependency relationship, in accordance with a result of searching a route in the tertiary supplementary map data between a first node and a second node, which are both ends of the second link, respectively, and a result of searching the route between the first node and the second node in the tertiary most recent map data; and
   a map difference data generation device that generates map difference data, which defines a combination of the update of the first link and the update of the second link, when the determination device determines that the update of the first link and the update of the second link have the dependency relationship.

2. The map difference data generation apparatus according to claim 1,
   wherein the supplementary map data storage device includes a first supplementary map data storage device that stores primary first supplementary map data indicating a connection status of the node and the link, which is initially equal to the primary most recent map data,
   wherein the map update reflection device generates the secondly most recent map data by adding the first link on the primary most recent map data, and generates secondly first supplementary map data by maintaining the primary first supplementary map data without any change, when the update of the first link requires adding the first link to the primary most recent map data,
   wherein the map update reflection device generates the tertiary most recent map data by deleting the second link from the secondly most recent map data, and generates tertiary first supplementary map data by deleting the second link from the secondly first supplementary map data, when the update of the second link requires deleting the second link from the secondly most recent map data,
   wherein, when the determination device searches the route in the tertiary first supplementary map data, and fails to search the route between the first node and the second node, the determination device searches the route in the tertiary most recent map data,
   wherein, when the determination device searches the route in the tertiary first supplementary map data, and succeeds to search the route, the determination device determines that addition of the first link and deletion of the second link have the dependency relationship, and
   wherein the map difference data generation device generates the map difference data, which defines a combination of the addition of the first link and the deletion of the second link, when the determination device determines that the addition of the first link and the deletion of the second link have the dependency relationship.

3. The map difference data generation apparatus according to claim 2,
   wherein the primary supplementary map data includes the primary first supplementary map data,
   wherein the secondly supplementary map data includes the secondly first supplementary map data, and
   wherein the tertiary supplementary map data includes the tertiary first supplementary map data.

4. The map difference data generation apparatus according to claim 1,
   wherein the supplementary map data storage device includes a second supplementary map data storage device that stores primary second supplementary map data indicating a connection status of the node and the link, which is initially equal to the primary most recent map data,
   wherein the map update reflection device generates the secondly most recent map data by deleting the first link from the primary most recent map data, and generates secondly second supplementary map data by maintaining the primary second supplementary map data without any change, when the update of the first link requires deleting the first link from the primary most recent map data, wherein the map update reflection device generates the tertiary most recent map data by deleting the second link from the secondly most recent map data, and generates tertiary second supplementary map data by maintaining the secondly second supplementary map data without any change, when the update of the second link requires deleting the second link from the secondly most recent map data, wherein the determination device generates temporary second supplementary map data, which is a copy of the tertiary second supplementary map data, and deletes the second link from the temporary second supplementary map data, wherein the determination device searches the route between the first node and the second node in the temporary second supplementary map data, wherein, when the determination device succeeds to search the route including the first link in the temporary second supplementary map data, the determination device determines that deletion of the first link and deletion of the second link have the dependency relationship, and wherein the map difference data generation device generates the map difference data, which defines a combination of the deletion of the first link and the deletion of the second link, when the determination device determines that the deletion of the first link and the deletion of the second link have the dependency relationship.

5. The map difference data generation apparatus according to claim 4, wherein the primary supplementary map data includes the primary second supplementary map data, wherein the secondly supplementary map data includes the secondly second supplementary map data, and wherein the tertiary supplementary map data includes the tertiary second supplementary map data.

6. The map difference data generation apparatus according to claim 1, further comprising:

a map difference data distribution device that distributes the map difference data generated by the map difference data generation device to an in-vehicle apparatus.

7. A map difference data generation method comprising:

preparing primary most recent map data indicating a connection status of a node and a link of a map;

preparing primary supplementary map data indicating a connection status of the node and the link, which is initially equal to the primary most recent map data;

generating secondary most recent map data and secondary supplementary map data in accordance with an update of a first link in the primary most recent map data when map update for updating the first link is established;

generating tertiary most recent map data and tertiary supplementary map data in accordance with an update of a second link in the secondly most recent map data when map update for updating the second link is established after the update of the first link;

determining whether the update of the first link and the update of the second link have a dependency relationship, in accordance with a result of searching a route in the tertiary supplementary map data between a first node and a second node, which are both ends of the second link, respectively, and a result of searching the route between the first node and the second node in the tertiary most recent map data; and generating map difference data, which defines a combination of the update of the first link and the update of the second link, when the determination device determines that the update of the first link and the update of the second link have the dependency relationship.

8. The map difference data generation method according to claim 7, further comprising:

preparing primary first supplementary map data indicating a connection status of the node and the link, which is initially equal to the primary most recent map data;

generating the secondly most recent map data by adding the first link on the primary most recent map data, and generating secondly first supplementary map data by maintaining the primary first supplementary map data without any change, when the update of the first link requires adding the first link to the primary most recent map data;

generating the tertiary most recent map data by deleting the second link from the secondly most recent map data, and generating tertiary first supplementary map data by deleting the second link from the secondly first supplementary map data, when the update of the second link requires deleting the second link from the secondly most recent map data;

searching the route in the tertiary first supplementary map data;

searching the route in the tertiary most recent map data when the route between the first node and the second node is not searched in the tertiary first supplementary map data;

determining that addition of the first link and deletion of the second link have the dependency relationship when the route between the first node and the second node is searched in the tertiary first supplementary map data; and generating the map difference data, which defines a combination of the addition of the first link and the deletion of the second link, when the addition of the first link and the deletion of the second link have the dependency relationship.

9. The map difference data generation method according to claim 8, wherein the primary supplementary map data includes the primary first supplementary map data, wherein the secondly supplementary map data includes the secondly first supplementary map data, and wherein the tertiary supplementary map data includes the tertiary first supplementary map data.

10. The map difference data generation method according to claim 7, further comprising:

preparing primary second supplementary map data indicating a connection status of the node and the link, which is initially equal to the primary most recent map data;

generating the secondly most recent map data by deleting the first link from the primary most recent map data, and generating secondly second supplementary map data by maintaining the primary second supplementary map data without any change, when the update of the first link requires deleting the first link from the primary most recent map data;

generating the tertiary most recent map data by deleting the second link from the secondly most recent map data, and generating tertiary second supplementary map data by maintaining the secondly second supplementary map data without any change, when the update of the second link requires deleting the second link from the secondly most recent map data, generating temporary second supplementary map data, which is a copy of the tertiary second supplementary map data, and deleting the second link from the temporary second supplementary map data;

searching the route between the first node and the second node in the temporary second supplementary map data;

determining that deletion of the first link and deletion of the second link have the dependency relationship when the route including the first link is searched in the temporary second supplementary map data; and generating the map difference data, which defines a combination of the deletion of the first link and the deletion of the second link, when the deletion of the first link and the deletion of the second link have the dependency relationship.

11. The map difference data generation method according to claim 10, wherein the primary supplementary map data includes the primary second supplementary map data, wherein the secondly supplementary map data includes the secondly second supplementary map data, and wherein the tertiary supplementary map data includes the tertiary second supplementary map data.

* * * * *